United States Patent [19]

Harry et al.

[11] Patent Number: 4,885,072
[45] Date of Patent: Dec. 5, 1989

[54] CONTAINER FOR CORROSIVE ELECTROLYTE

[76] Inventors: John O. Harry, P.O. Box 10386, Green Bay, Wis. 54307; George Verhagen, 1767 Asbury Cir., Green Bay, Wis. 54303

[21] Appl. No.: 253,045

[22] Filed: Oct. 4, 1988

[51] Int. Cl.[4] .......................... C25B 9/00; C25C 7/00; B65D 85/84; B28B 1/14
[52] U.S. Cl. ................................. 204/279; 206/524.5; 264/299; 524/494
[58] Field of Search ........ 204/279, 242, 106, 267–269; 264/299, 328.8, 311; 524/494; 206/524.5

[56] References Cited

U.S. PATENT DOCUMENTS

| | | | |
|---|---|---|---|
| 2,816,070 | 12/1957 | Buchanan | 204/279 |
| 3,401,109 | 9/1968 | Anderson | 204/242 |
| 3,403,091 | 9/1968 | Currey et al. | 204/242 |
| 3,409,536 | 11/1968 | Barber et al. | 204/242 X |
| 3,679,568 | 7/1972 | Westerlund | 204/279 X |
| 3,763,083 | 10/1973 | Grotheer | 204/279 X |
| 4,213,842 | 7/1980 | Dufresne | 204/279 |

OTHER PUBLICATIONS

High Quality EFCO Form Produces Complicated Concrete Structures in Form Marks, Spring/Summer 1982.
Intercompany Telex of AT&T Nassau Metals, S. Carouna, U.S.A., Electrolytic Cells at Cominco's Lead and Zinc Operations Report.

Primary Examiner—Donald R. Valentine
Attorney, Agent, or Firm—Fred Wiviott

[57] ABSTRACT

A container in which minerals such as copper are purified in an electrolytic process includes bottom, end and side walls for containing a corrosive electrolyte, such as, a sulphuric or hydrochloric acid solution. The bottom, end and side walls of the container are composed of a cured mixture of 10–19 percent of a modified, vinylester or polyester thermosetting resin and the balance consisting of ¼"–1/64" inch crystalline silica, fine silica sand or silica flour and glass beads approximately four microns in size and/or mica flakes about 1/64" in size. The container is formed in a continuous pouring process and includes non-conductive reinforcing rods.

18 Claims, 1 Drawing Sheet

CONTAINER FOR CORROSIVE ELECTROLYTE

BACKGROUND OF THE INVENTION

This invention relates to containers for highly corrosive solutions and more particularly to containers for use in the electrolytic refinement or electrowinning of metals such as copper.

In one type of process, the refinement of metals such as copper, a substantially pure copper anode is immersed in a suitable electrolyte, such as, a hydrochloric or sulphuric acid solution. The copper is deposited in a pure form on a cathode when an electric current is passed between the electrodes.

One type of prior art container employed for such electrolytic cells consists of a concrete shell having iron reinforcing bars and a lead or plastic liner. Such containers were not wholly satisfactory because the linings often failed causing the concrete to fail before the leaks were detected resulting in the loss of slimes and electrolyte. For this reason prior art concrete cells required high maintenance, high repair and replacement costs and caused excessive downtime and lost production. In addition, the iron reinforcing bars provide a leakage path to stray electric currents which reduced current efficiency and affected cathode quality.

One prior art effort to improve such electrolytic cells included a shell fabricated from a mixture of about 20 percent resin and 80 percent various aggregates such as pea size gravel, fine silica sand, silica flour and one-quarter to one-eighth inch chopped fiberglass strands. These prior art cells had the disadvantage of relatively high fabrication costs, and a susceptibility to short circuiting as a result of the use of reinforcing rods which include ferrous materials. Another disadvantage of prior art cells was that the molding process by which they were formed resulted in cold joints, irregular internal surfaces and required that overflow boxes be separately attached.

SUMMARY OF THE INVENTION

It is an object of the invention to provide a new and improved container for electrolytic materials.

Another object of the invention is to provide containers for electrolytic materials which are relatively more economical than prior art containers.

A further object of the invention is to provide a container for electrolytic materials wherein the likelihood of short circuits is minimized.

Yet another object of the invention is to provide a container for electrolytic materials which does not require a lining.

A still further object of the invention is to provide a container for electrolytic cells which has a longer life and lower maintenance costs and is easier to maintain and install than prior art cells.

Another objective of the invention is to provide an electrolytic cell that permits operation at higher temperatures and higher current densities.

A further objective of the invention is to provide an electrolytic cell in which improved productivity and quality can be obtained without adversely affecting the performance or useful life of the cell.

Still another objective of the invention is to provide an electrolytic cell which permits an increase in total plant capacity without changing the physical size of the plant.

It is also an objective of the invention to provide an electrolytic cell which permits greater electrolyte flow.

An additional objective of the invention is to provide an electrolytic cell in which increased capacity and quality are obtained without increasing overall production cost.

Still a further objective of the invention is to provide an electrolytic cell which permits the elimination of separate insulator boards.

These and other objects and advantages of the present invention will become more apparent from the detailed description thereof.

In general terms, one aspect of the invention comprising a container for an electrolytic process consisting of a cured mixture of 10% to 19% by weight vinylester or polyester thermosetting resin modified by the addition of a thinning agent, inhibitors, promoters and catalyst and the balance consisting of crystalline silica particles and particles taken from the group consisting of glass beads and mica flakes. The crystalline silica may comprise a mixture of 80%–90% by weight particles which are $\frac{1}{4}''$–1/32$''$ in size, 10%–15% by weight fine silica sand or silica flour and 1%–5% by weight mica flakes and/or glass spheres. The modified vinylester resin may comprise 80%–90% vinylester resin and the balance a thinning agent, inhibitors, promoters and catalyst. The crystalline silica comprises 40%–50% by weight particles $\frac{1}{4}''$–$\frac{1}{8}''$ in size, 10%–25% by weight particles $\frac{1}{8}''$–1/16$''$ in size and 10%–15% by weight particles 1/16$''$–1/32$''$ in size and 10%–15% fine silica sand and/or silica flour. Precured bars of fiberglass or other suitable nonconductive material are preferably molded into the bottom of the container and extended up into the side walls and end walls. The viscosity of the modified vinylester resin is less than 200 CPS as measured by a Brookfield viscosity meter Model LVT at 77° F. with a #3 spindle at 60 RPM.

According to another aspect, the invention comprises a method of manufacturing a container for an electrolytic process comprising the steps of mixing 10%–19% by weight of a vinylester or polyester thermosetting resin modified by the addition of a thinning agent, inhibitors, promoters and catalyst and the balance consisting of crystalline silica particles and particles taken from a group consisting of glass beads and/or mica flakes, continuously pouring the mixture into a mold which defines bottom, ends, side walls and overflow box and allowing said molded mixture to cure.

DETAILED DESCRIPTION OF THE PREFERRED EMBODIMENT

Figure 2:
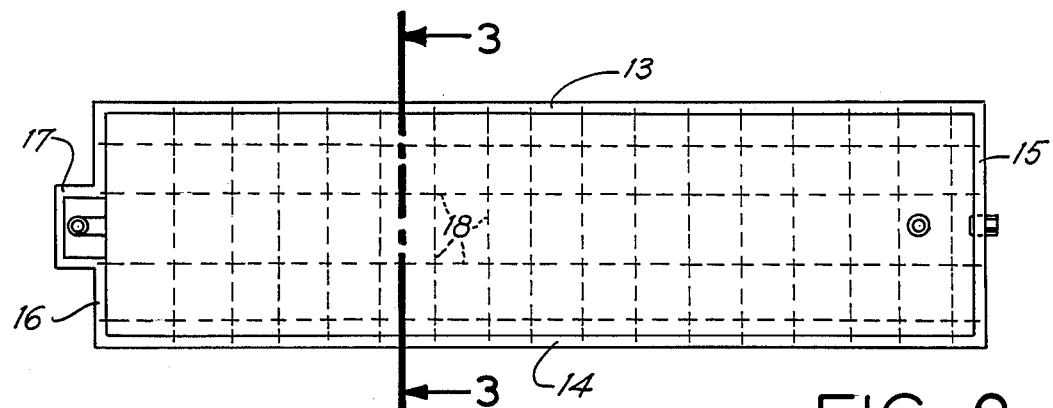
FIG. 2 is a top plan view thereof.
Figure 1:
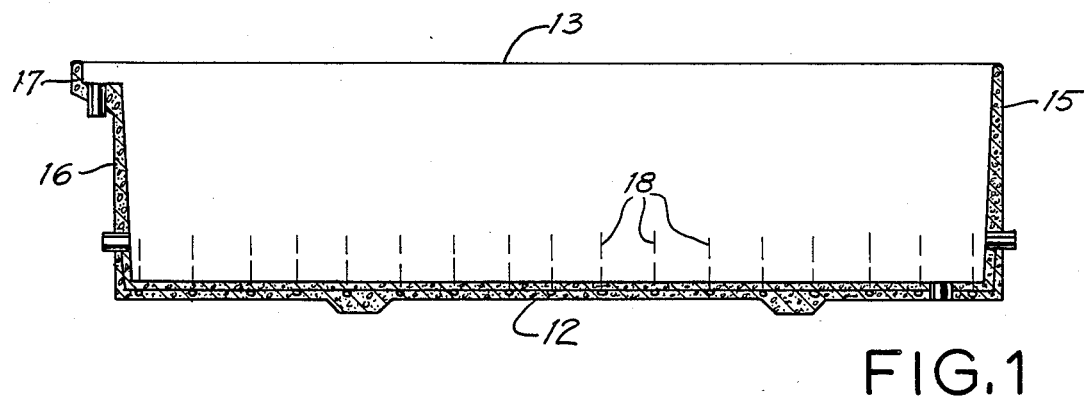
FIG. 1 is a side elevational view partly in section showing a cell according to my invention.
Figure 3:
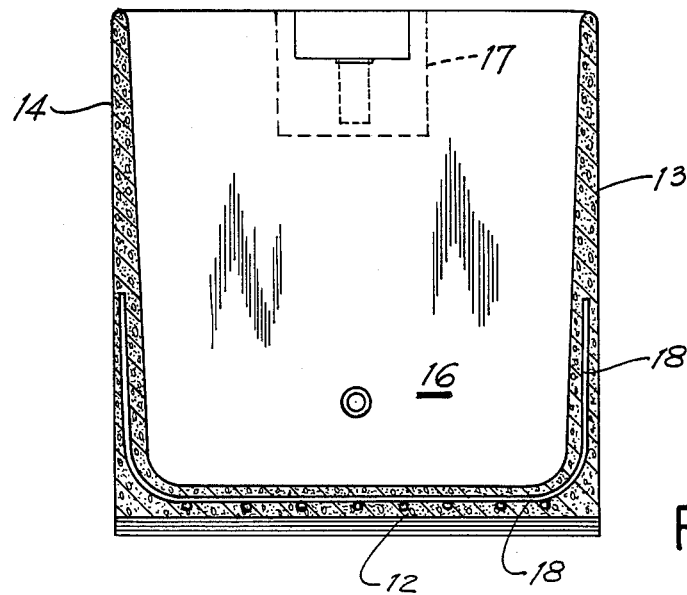
FIG. 3 is a view taken along lines 3—3 of FIG. 2.

The invention relates to a cell for containing a corrosive liquid such as the electrolyte employed in an electroplating operation. As those skilled in the art will appreciate, electrolytic cells employed for purifying metals, such as copper, consist of a container for an electrolyte, such as a sulfuric or hydrochloric acid solution. One process uses an anode consisting of relatively pure copper, i.e., about 99% copper, and a starter sheet of a purer copper or other suitable material, which are immersed in an electrolyte. The anode and starter sheet or cathode are placed in series with an electrical energy source so that the passage of current between the anode and cathode and through the electrolyte causes copper ions to flow from the anode through the electrolyte to the cathode. This provides a body of copper at the cathode which is 99.9% pure. Precious metals such as gold, silver, platinum, and other metals and by-products collect in a sludge which forms at the bottom of the cell.

A cell 10 according to the invention is shown in the drawings to include a bottom 12, side walls 13 and 14 and end walls 15 and 16. An overflow box 17 is integrally cast on end wall 16. The walls 13, 14, 15 and 16 taper from bottom to top as molded. A matrix of reinforcing bars 18, of a nonconductive material, such as FRP fiberglass, is disposed in the bottom 12 and extends partially up the side and end walls 13, 14, 15 and 16.

Electrolytic cells of the type discussed above must be nonporous and possess sufficient mechanical strength and must be chemically inert relative to the electrolyte which comprises a sulfuric or hydrochloric acid solution. The cell according to the preferred embodiment of the present invention comprises a mixture of 10%–19% by weight of a modified vinylester or polyester thermosetting resin and, the balance consists of a mixture of crystalline silica particles, mica flakes, and/or glass beads. The vinylester or polyester resin is thinned to reduce viscosity and permit higher filler loading. The viscosity of the vinylester or polyester resin should be less than 200 CPS as measured by a Brookfield viscosity meter Model LVT at 77° F. with a #3 spindle at 60 RPM. According to one example, the components by weight of the modified vinylester resin are as follows:
80%–90% vinylester resin;
10%–20% styrene monomer (thinner);
1%5% degassing agent;
0.2%–2% methyl ethyl ketone peroxide, or cumene hydroperoxide (catalyst);
0.05%–0.2% inhibitor;
0.2%–0.6% cobalt napthalate (6%) (promoter)
0.02%–0.5% dimethyl aniline (100%) (promoter);
Any suitable inhibitor, such as 2.4 pentanedione may be employed and any suitable degassing agent such as xylene or acitone may be used.

The dry mixture comprises:
40%–60% ⅛"–¼" crystalline silica
10%–25% 1/16"–⅛" crystalline silica
10%–15% 1/32"–1/16" crystalline silica
10%–15% fine silica sand
1% mica flakes The proportions of resin and dry ingredients by weight in the final mixture, according to the preferred embodiment of the invention, are as follows:
10%–19% modified vinylester or polyester resin
40%–60% ⅛"×¼" crystalline silica
10%–25% 1/16"×⅛" crystalline silica
10%–15% 1/32"×1/16" crystalline silica
10%–15% fine silica sand or silica flower
9%–5% mica flakes and/or glass spheres In one specific example a resin mixture was prepared with the following ingredients:
450 pounds vinylester resin;
85 pounds styrene monomer;
13 pounds xylene;
1.5 pounds methyl ethyl ketone peroxide;
15 ounces pentanedione;
22 ounces cobalt napthalate;
2 ounces dimethyl aniline Twenty-five pounds of the foregoing modified resin mixture was then mixed with the following quantities of dry ingredients:
100 pounds ⅛"–¼" crystalline silica
40 pounds 1/16"–⅛" crystalline silica
20 pounds 1/32"–1/16" crystalline silica
20 pounds fine silica sand
2 pounds mica flakes The resin acts as a binder for the dry materials and fills the interstices therebetween so that the container is impervious to the electrolyte solution and forms a corrosion-resistant material unaffected by the electrolyte solution. The mica and/or glass spheres provide a tighter composite material which also reduces porosity and increases physical strength. The nonconductor reinforcing bars increase physical strength and allow the cells to be supported in only two areas if necessary.

It was the practice to pour prior art cells in an upright mold. Because the inside bottom, side and end walls of the cell must be smooth to facilitate removal of the sludge, one common Practice in molding prior art cells was to pour and trowel the bottom surface before continuing to pour the side and end walls. This sometimes resulted in a cold joint which adversely affected the physical strength of the cell and produced areas of leakage.

The container according to the preferred embodiment of the invention is formed by mixing the resin and dry ingredients and then pouring the same continuously into an inverted mold. The mixture is then allowed to cure at room temperatures. Because an inverted mold is used, the inside bottom, side and end wall surfaces are in contact with a smooth mold surface. Accordingly, these surfaces will also be relatively smooth without troweling. This permits continuous casting of the cell to insure that no cold joints are formed.

Casting the cell upside down also facilitates the casting of an integral overflow box with the cell. As a result, greater physical strength is achieved over prior art cells where the overflow box was cast separately and then attached to the cell. This prior art method caused leaks and made the overflow box susceptible to mechanical damage.

Because of the strength of the cell made in accordance with the mixture and reinforcing bars discussed above, a cell wall thickness of about two and one half inches at the top and three and one half inches at the bottom is satisfactory for a conventional cell which is about sixteen feet in length, four and one half feet in height and four and one half feet in width. Conventional concrete cells have a wall thickness of about five to six inches. As a result, cells made in accordance with the present invention provides cells with a greater internal capacity for the same outside dimensions. Since the one factor in determining the electrorefining capacity of a refining facility is by the number of cells and their capacity, the use of cells having thinner walls significantly increases total plant capacity. A typical electrolytic refinery has capacity of approximately 120,000 tons per year. This capacity could increase, for example, by approximately 7,000,000 pounds per year with the additional internal cell capacity.

While the life expectancy of cells according to the present invention has not as yet been determined, it is estimated that as a result of their physical strength, impermeability and non-conductiveness, their useful life will be much longer than conventional concrete cells. In addition, any physical damage to cells according to the invention can be more readily repaired than prior art concrete cells, thereby reducing maintenance costs and production downtime.

The operating temperature of some prior art cells was limited to about 160° F. because the plastic linings employed tended to lose shape and reduce useful life at higher temperatures. With the cell according to the present invention, coupled with the use of nonconducting reinforcing rods, higher current densities and temperatures can be employed, thereby increasing production rates, quality and capacity.

Bars of elongate and preformed nonconductive material, such as, for example, precured fiberglass are preferably inserted into the bottom and side walls and corners of bottom-side and bottom-end wall corners of the container as the same is being poured thereby substantially increasing the physical strength properties and minimizing the possibility of electrical short-circuiting due to the use of metallic reinforcing bars in prior art containers. Such reinforcing lap boards which support the bars permit the electrodes to be mounted directly on the cell wall, thereby eliminating the necessity for an insulating board as in prior art devices.

While only a single embodiment of the invention is described herein, it is not intended to be limited thereby but only by the scope of the appended claims.

We claim:

1. A container for a corrosive electrolyte used in an electrolytic process, said container consisting of a cured mixture of 10% to 19% by weight of a resin taken from the group consisting of vinylester and polyester thermosetting resin modified by the addition of a thinning agent and the balance consisting of crystalline silica particles and particles taken from a group consisting of glass beads and mica flakes.

2. The container set forth in claim 1 wherein the crystalline silica comprises a mixture of 80%–90% by weight Particles which are ¼"–1/32" in size, 10%–15% by weight particles taken from the group consisting of fine silica sand silica flour and 1%–5% by weight particles taken from the group consisting of mica flakes and glass spheres.

3. The container set forth in claim 2 wherein the modified resin comprises 80%–90% of a resin taken from the group consisting of vinylester and polyester resin and the balance a thinning agent, inhibitors, promoters and a catalyst.

4. The container set forth in claim 3 wherein the crystalline silica comprises 40%–60% by weight particles ¼"–⅛" in size, 10%–25% by weight particles ⅛"–1/16" and 10%–15% by weight particles 1/16"–1/32" in size, 10%–15% fine silica sand or silica flour and including 0.9–5% by weight mica flakes about 1/64" in size and 0.9%–5% glass spheres about four microns in size.

5. The container set forth in claim 4 wherein the reinforcing bars of a nonconductive material molded into the walls and bottom of the container.

6. The container set forth in claim 2 wherein the crystalline silica comprises 40%–60% by weight particles ¼"–⅛" in size, 10%–25% by weight particles ⅛"1/16" in size
and 10%–15% by weight particles 1/16"–1/32" in size, 10%–15% fine
or silica flour and including 0.9%–5% by weight mica flakes about 1/64" in size and 0.9%–5% by weight glass spheres about four microns in size.

7. The container set forth in claim 6 wherein the viscosity of the modified resin is less than 200 CPS as measured by a Brookfield viscosity meter Model LVT at 77° F. with a #3 spindle at 60 RPM.

8. The container set forth in claim 1 therein the modified resin comprises 80%–90% of a resin taken from the group consisting of vinylester and polyester resin and the balance a thinning agent, inhibitors, promoters and a catalyst.

9. The container set forth in claim 8 wherein the crystalline silica comprises 40%–60% by weight particles ¼"–⅛" in size, 10%–25% by weight particles ⅛"–1/16", and 10%–15% by weight particles 1/16"–1/32" in size, 10%–15% fine silica sand or silica flour and including 1%–5% by weight mica flakes about 1/64" in size or 9%–5% by weight glass spheres about four microns in size.

10. The container set forth in claim 9 and including reinforcing bars of a nonconductive material molded into the walls and bottom of the container.

11. The container in claim 9 wherein the viscosity of the modified resin is less than 200 CPS as measured by a Brookfield viscosity meter Model LVT at 77° F. with a #3 spindle at 60 RPM.

12. The container set forth in claim 1 wherein the viscosity of the modified resin is less than 200 CPS as measured by a
Brookfield viscosity meter Model LVT at 77° F. with a #3 spindle at 60 RPM.

13. A method of manufacturing a container for containing a corrosive electrolyte used in an electrolytic process, said method comprising the steps of mixing 10%–19% by weight of a thermosetting resin taken from the group consisting of vinylester and polyester resin modified by the addition of a thinning agent inhibitors, promoters and catalyst and the balance consisting of crystalline silica particles and particles taken from a group consisting of glass beads and mica flakes, and continuously pouring the mixture into an inverted mold which defines bottom, ends and side walls and allowing said molded mixture to cure whereby the inner surfaces of the container will contact the mold surfaces so that smooth inner surfaces will be molded.

14. The method set forth in claim 13 wherein the crystalline silica comprises a mixture which are ¼"–1/32" in size, 10%–15% by weight particles taken from the group consisting of fine silica sand silica flour and 0.9%–5% by weight of particles taken from the group consisting of mica flakes about 1/64" in size and glass spheres about four microns in size.

15. The method set forth in claim 14 wherein the modified
resin comprises 80%–90% of a resin taken from the group consisting of vinylester and polyester resin and the balance a thinning agent, inhibitors, promoters and catalyst.

16. The method set forth in claim 15 wherein the crystalline silica comprises 40%–50% by weight particles which are ¼"–⅛" size, 10%–25% by weight particles which are ⅛"–1/16" in size 10%–15% by weight particles which are 1/16"–1/32" in size, 10%–15% particles taken from the group consisting of fine silica sand and silica flour.

17. The method set forth in claim 16 and including the step of molding an overflow box integrally with said container.

18. The method set forth in claim 13 and including the step of molding an overflow box integrally with said container.

* * * * *

UNITED STATES PATENT AND TRADEMARK OFFICE
CERTIFICATE OF CORRECTION

PATENT NO. : 4,885,072

DATED : Dec. 5, 1989

INVENTOR(S) : John O. Harry and George Verhagen

It is certified that error appears in the above-identified patent and that said Letters Patent is hereby corrected as shown below:

Column 3, line 57, cancel "9%-5%" and substitute --.9%-5%--.

Column 5, line 64, after "fine" insert --silica sand--.

Column 6, line 14, cancel "9%-5%" and substitute --.9%-5%--.

Column 6, line 43, after "mixture" insert --of 80%-90% by weight of particles--.

Signed and Sealed this

Seventh Day of May, 1991

Attest:

HARRY F. MANBECK, JR.

Attesting Officer

Commissioner of Patents and Trademarks